United States Patent Office 3,495,449
Patented Feb. 17, 1970

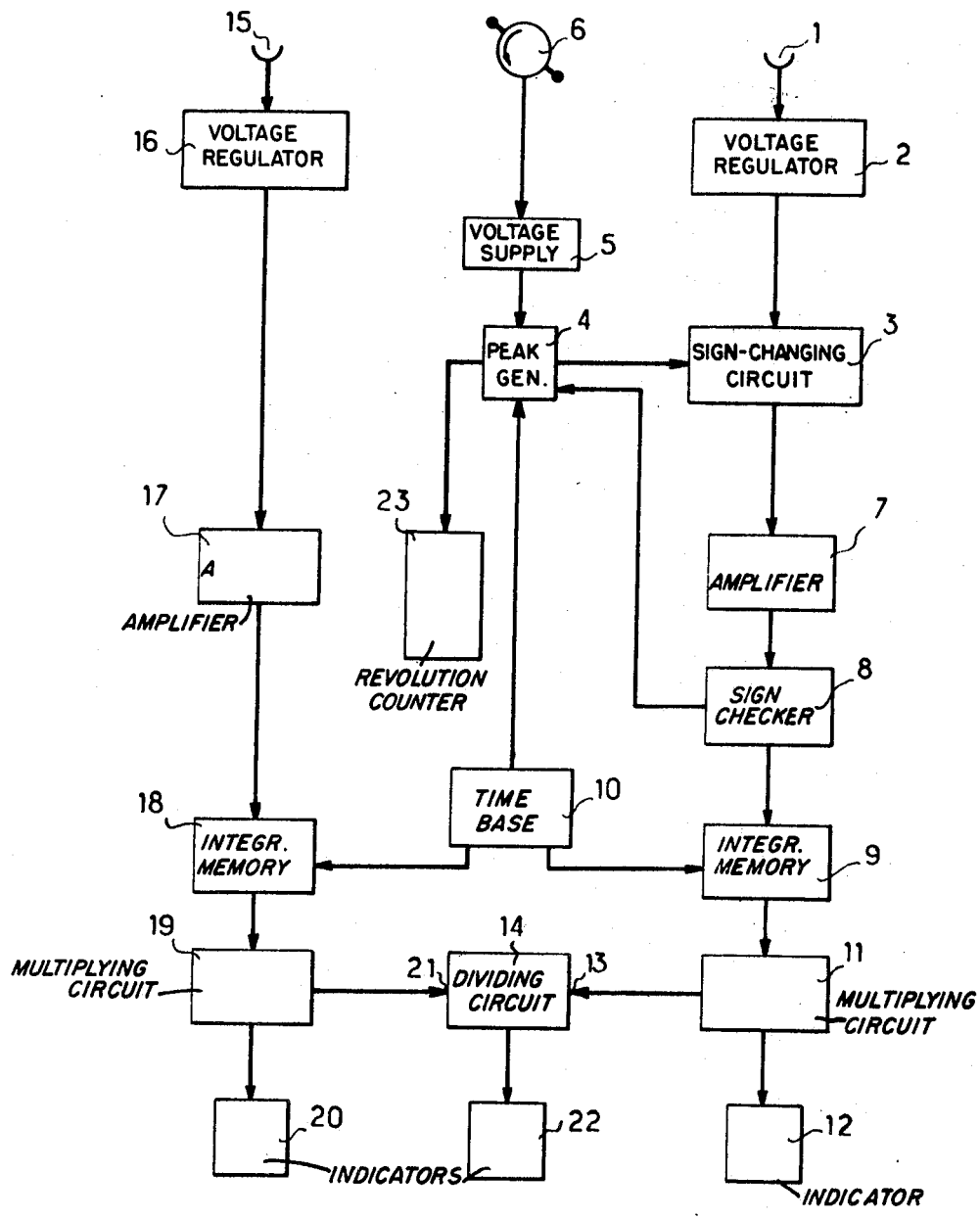

3,495,449
METHOD OF DETERMINING THE POWER DEVELOPED OR ABSORBED BY A MACHINE AND APPARATUS FOR CARRYING OUT SAID METHOD
Rene A. Terminet, Noisy-le-Roi, France, assignor to Société Anonyme dite: Société Nationale des Petroles d'Aquitaine, Paris, France, a French company
Filed June 24, 1968, Ser. No. 739,457
Claims priority, application France, June 29, 1967, 112,388
Int. Cl. G01l 3/26
U.S. Cl. 73—112                                    12 Claims

ABSTRACT OF THE DISCLOSURE

Method and electrical apparatus for producing electrical signals representative of the absolute pressure within the chamber of an expansible chamber machine, and of the power supplied to said machine, and deriving therefrom indications of the power developed or utilized, and the efficiency of the machine.

---

There is an established demand for devices capable of determining the energy supplied or absorbed by combustion engines and compressors, that is to say the ratio of the useful power furnished to the power consumed.

The present invention relates to a new process of determining the efficiency of such machines in a simple and accurate manner.

The invention relates to so-called expansible chamber machines of the type in which the closed chambers undergo changes in volume and pressure, as is the case in combustion engines and diesel engines of the conventional piston type, and even compressors of the types utilizing pistons.

It is known that for each cycle of such motors the energy developed or absorbed is equal to the ratio between the integral of the pressure inside the cylinders of the machine and the variation in volume of the gas enclosed in said cylinders.

It is also known that the variation in the volume of the cylinders, in a machine of this type, is not proportional to the angle through which the crankshaft rotates and that the instantaneous speed of rotation of the crankshaft oscillates during the course of each revolution about an average value, even in the case of motors turning in a constant cycle.

It follows that the devices heretofore used to measure the power developed or absorbed inside the cylinders of such a machine are quite complex, since in order to determine the power absorbed or applied over a given time it is necessary to establish at each instant the law governing the variation in volume as a function of time, which requires in the long run that the instantaneous speed of the crankshaft be taken into consideration and this can be done only with relatively expensive, complex and fragile apparatus.

Moreover, it is sometimes impossible to secure access to the crankshaft of such a machine, which then eliminates the possibility of using the processes and apparatus now known.

This applies particularly in the case of motor and compressor cylinders which are mounted on a single crankshaft which neither is mechanically driven or itself mechanically drives any member outside the machine. Such machines, known as motor-compressors, are, in particular, used to compress gas which is to be transported in pipe-lines. Such motor-compressors draw off part of the gas they compress and use it to obtain the energy necessary to cause compression. The power developed by these motor-compressors, and consequently their efficiency, cannot be determined by conventional methods.

Furthermore, the known processes do not make it possible to determine the efficiency of motors mounted on vehicles, for example, very easily.

Thus, while the efficiency of an automobile motor may be measured well enough while the motor is on a test rack, it is impossible to carry out road tests with the motor mounted on a vehicle.

The present invention relates to a process which makes it possible to determine the energy furnished or absorbed by a machine during a given time (that is to say its average power over a relatively short time) without necessarily having access to the crankshaft of the machine, while using only a device indicating the pressure in the cylinder or cylinders.

It is an object of the invention to provide a new method of measuring the energy developed or absorbed during a given period of time in a machine comprising a closed chamber of variable volume subjected to a variable pressure, which process is characterized by the fact that the pressure inside the closed chamber is integrated over a given period of time, said period having different signs attributed to it, depending on whether it is measured during an increase or a decrease in the variable volume.

In one particular embodiment the pressure inside the chamber of variable volume is caused to produce an electrical parameter having a magnitude proportional to the absolute value of the pressure, this magnitude being assigned a positive sign during the periods corresponding to an increase in the volume of the cylinder and a negative sign during the periods corresponding to a decrease in the volume of the cylinder, and then integrated as a function of time.

It has been discovered in a surprising manner that the energy developed or absorbed in the machine over a given interval of time is directly proportional to the value of the integral obtained in this manner, that is to say, without any need to take into account the variations in the volume as a function of time and of the variations in the instantaneous angular speed of the crankshaft.

A value proportional to the power developed or absorbed by the machine may thus be obtained merely by continuously measuring the pressure prevailing in the cylinder over a period of time.

It follows that the optimum operating cycle of the machine may be determined by finding the maximum value which may be obtained for the integral of the pressure, without knowing the proportional relationship between the power developed or absorbed and the integral of the pressure.

The instantaneous power may be easily obtained after having determined the coefficient of proportionality by measuring the power by means of conventional apparatus, and dividing the energy measured by the time over which the measurement in accordance with the invention is carried out.

In accordance with the invention the power developed or absorbed by the machine may be compared with the power furnished to the machine, said last mentioned power having been converted into an electrical magnitude of the same type as the one used to determine the power developed or absorbed, said two magnitudes being multiplied by constants designed to impart thereto the same coefficient of proportionality with respect to actual powers, the ratio of these magnitudes providing an indication of the efficiency of the machine.

The present invention also relates to a device for carrying out the process which has just been described.

It is an object of the present invention to measure the energy developed or absorbed over a given period of time by a machine having variable volume chambers subjected to variable pressures, characterized by the fact that it comprises in combination means for instantaneously converting the pressure inside each cylinder into an electrical magnitude proportional to the absolute value of this pressure, means for imparting to this magnitude a positive sign when the volume of the cylinder is increasing and a negative sign when said volume is decreasing, means for thereafter integrating said magnitude as a function of time, and means for recording and memorizing the integral thus obtained.

In one particular embodiment of the invention, the means for converting the pressure in a cylinder into an electrical magnitude is a pressure-responsive device capable of producing an electrical signal in the form of a continuous positive or negative electrical current, proportional to the absolute value of the pressure in the cylinder.

In accordance with the invention, this pressure-responsive device may be of a known type, such as a piezoelectric device, a capacitative measuring device, a variable resistance device, an optical pressure-measuring device, etc. All that is necessary is for the pressure measuring device to have a natural frequency much greater than that of the phenomenon to be measured. This device may advantageously be mounted in a spark plug or in the body of an injector.

In one specific embodiment of the invention, the means for changing the sign of the electrical magnitude at each change in the cycle of the machine is a sign-changing unit associated with a pulse generator which produces a pulse at each change of sign in the variation of volume of the cylinder, that is to say, for example, each time the speed of the piston drops to zero during a change in its direction of movement. Each pulse is transmitted to the sign changing unit to change its polarity.

In one embodiment of the invention, the means for integrating the electrical magnitude proportional to the pressure, to which the appropriate sign has been applied by the sign changing unit, is a differential integrator which delivers a current proportional to the integral of the pressure in the cylinder as a function of time.

Since the magnitude delivered by the integrating circuit must be positive, since it corresponds to the energy developed or absorbed by the machine, a sign controller controls the pulse generator and erases a pulse when the quantity delivered by the integrating circuit is negative in sign.

In a preferred embodiment of the invention, the integrating circuit associated with the sign controller is connected to an integration memory, which memorizes at each instant the energy developed or absorbed by the machine.

One particular embodiment of the invention also comprises means for converting the energy furnished to the machine into an electrical magnitude of the same type as that used for the analogous computation of the energy developed or absorbed by the machine. This means may be a flowmeter measuring the flow of fuel consumed by the machine if it derives its energy from a chemical reaction, a voltmeter if the machine is powered by electricity, or any other apparatus capable of measuring the energy furnished to the machine and converting it into an electrical magnitude.

In accordance with the invention, this device may also comprise a circuit for integrating the electrical magnitude proportional to the energy supplied to the machine, which is connected to an integration memory which records at each instant the energy which has been supplied to the machine.

One particular embodiment of the invention also comprises a time base capable of interrogating and clearing the integration memories for the energy developed by the machine and the energy furnished to the machine at given intervals of time, the electrical magnitudes indicated at these moments being transmitted to multiplying circuits adapted to take into account the correlating function of the calculation of the integral of the energy developed or absorbed by the machine, and to impart to the electrical magnitude proportional to the energy furnished to the machine the same similarity to the actual energy as that of the electrical magnitude proportional to the energy developed or absorbed by the machine over a given period of time.

In one particular embodiment of the invention the pulse generator also supplies pulses to a revolution counter controlled by a time base of 30 seconds, which yields directly the number of revolutions of the machine per minute, it being understood that the pulse generator produces two pulses per revolution of the machine.

The time base serving and controlling the integration memories may also serve and control the revolution counter. The time base of the revolution counter is then automatically cut out of service and the revolution counter is then automatically cut out of service and the revolution counter utilizes a multiplying coefficient to take into account the time base utilized, when the later may adopt different values at will.

It is also possible to utilize a single time base having a fixed value to serve and control both the revolution counter and the integration memories.

In order that the invention may be better understood, one example will now be described, purely by way of illustration, with reference to the accompanying drawings, in which:

The figure shows a circuit diagram of a device embodying the invention for use in calculating the power and efficiency of an alternator.

The manometer 1, which measures the pressure inside the cylinder, transmits its information to a voltage regulator 2 which delivers a positive voltage proportional to the pressure inside the cylinder.

This voltage is then transmitted to a sign changing circuit 3 capable of inverting the sign of the voltage received each time it receives a signal from the peak generator 4.

The pulse generator 4 is itself controlled by a supply 5 and a device 6 which delivers a signal at each upper and lower deadpoint during the rotation of the machine. Consequently, the pulse generator 4 so controls the sign changer 3 that the latter reverses the sign of the voltage furnished thereto by the voltage regulator 2 each time the movement of the piston in the cylinder changes direction.

The voltages on which a different sign is impressed at each half-revolution of the machine are then fed to an integrator amplifier 7 capable of integrating the voltages supplied thereto, as a function of time, or of the angle of rotation of the machine.

The integrated voltages are then fed to a sign checker 8 which verifies that the quantity supplied to it is positive.

If it is not, the sign checker feeds a holding pulse to the pulse generator 4 which has the effect of erasing the pulse which would otherwise have been sent immediately thereafter by the pulse generator 4 to the sign changer 3, this inversion of the polarity of the sign changer rendering positive the quantities leaving the integrator amplifier.

The integrated voltages leaving the sign checker are fed to an integration memory 9 controlled at adjustable intervals of time by a time base 10.

At each interrogation the integration memory 9 restores the integrated quantity which it has recorded during the preceding interval of time and feeds it to a multiplying circuit 11, which multiplies the integrated quantity by a predetermined number, and this multiplied quantity is fed to a register or indicator 12, and to the input 13 of a dividing circuit 14.

Measuring means 15 transmits to a voltage regulator 16 a magnitude proportional to the energy furnished to said machine.

The voltage regulator 16 supplies a positive voltage proportional to the energy furnished to the machine which magnitude is integrated as a function of time by an integrating amplifier 17 which feeds the integrated magnitude to an integration memory 18.

The integration memory 18 is pulsed by the time base 10 at the same time as the integration memory 9 and emits at that instant the magnitude which it has memorized over the preceding interval of time. This is fed to a multiplying circuit 19 which multiplies the magnitude received by a suitable number Q.

The quantity emanating from the multiplier circuit is fed to a recorder or indicator 20 and to the input of a divider 14.

The multipliers W and Q which multiply the magnitudes received by the circuits 11 and 19 are designed to render uniform the coefficient of proportionality of the electrical magnitudes leaving the circuits 19 and 11, with respect to the actual powers furnished the machine and developed or absorbed by the machine.

The divider 14 supplies to the recorder or indicator 22 a quantity which is the quotient of the magnitude which it receives from the multiplier 11 divided by the magnitude received from the multiplier 19. The pulse generator 4 feeds its pulses to a tachometer 23 having a time base of 30 seconds, which provides a direct indication of the number of revolutions per minute made by the machine.

The time base 10 may also serve and drive the revolution counter 23, in which case the pulse generator 4 is cut out of service. In that case the revolution counter applies a multiplying coefficient to take into account the value of the time base 10, which may be set for example, to operate on 1, 5, 10, 15 or 20 second intervals.

It follows from the foregoing description that the electrical magnitude emanating from the sign changer 3 is proportional in absolute value to the pressure inside the cylinder of the machine, said magnitude being assigned a positive sign during the active phase of the cycle of the machine, that is to say while the volume of gas in the cylinder is increasing, and a negative sign during the opposite phase of the cycle.

It follows that the quantity integrated by the amplifier integrator 7 will be proportional to the energy developed or absorbed by the machine during the time considered, and that the integration memory makes it possible to determine the energy developed over the interval of time between two interrogations by the time base.

The integration memory 9, interrogated at regular intervals of time, thus makes it possible to determine the power developed or absorbed by the machine.

In like manner, the integration memory 18 makes it possible to determine the power supplied to the machine.

The electrical magnitudes proportional to the powers developed and supplied are respectively multiplied in the multipliers 11 and 19 by numbers designed to render their coefficients of proportionality relative to the real powers uniform.

The power developed is recorded on the register 12; the power furnished is recorded or indicated on the register or indicator 20, and the register or indicator 22 records or indicates the efficiency of the machine calculated by divider 14.

This measuring device makes it possible to test machines and greatly simplify the regulation of various parameters thereof so as to enable them to be operated at their maximum efficiency.

What is claimed is:

1. Method of measuring the energy developed or absorbed over a given period of time by a machine comprising a closed variable volume chamber subjected to a variable pressure, which method comprises the steps of assigning said pressure positive and negative values indicative of whether it is measured while the volume of said chamber is increasing or decreasing and integrating said pressure in said chamber over said period as a function of time, using a constant time base independent of the instantaneous volume of said chamber.

2. Method as claimed in claim 1 comprising the step of producing an electrical parameter having a magnitude proportional to the absolute value of said pressure, imparting to said magnitude a positive sign during those periods corresponding to an increase in the volume of said chamber and a negative sign during those periods corresponding to a decrease in the volume of said chamber, and integrating the resulting parameter magnitude as a function of time, using a constant time base independent of the instantaneous volume of said chamber.

3. Method of comparing the power developed or absorbed by a machine to the power supplied to said machine which method comprises the steps of producing a first electrical parameter having a magnitude representative of the power developed or absorbed by utilizing the method of claim 1, producing a second electrical parameter of the same nature as said first parameter but having a magnitude representative of the power supplied to said machine, both said magnitudes bearing the same relationship to the actual powers they represent, and comparing said magnitudes.

4. Method of determining the efficiency of a machine which comprises the step of determining the proportional relationship between the two magnitudes obtained in claim 3.

5. Apparatus for measuring the energy developed or absorbed over a given time by a machine comprising a variable volume chamber subjected to a varying pressure, said apparatus comprising in combination means for producing an electrical signal having the magnitude proportionate to the absolute value of the instantaneous pressure in said chamber, means for imparting to said magnitude a positive sign when the volume of said chamber is increasing and a negative sign when said volume is decreasing, means for integrating the resulting magnitude as a function of time, using a constant time base independent of the instantaneous volume of said chamber, and means for recording and memorizing the resulting integral.

6. Apparatus as claimed in claim 5 in which said signal producing means is a pressure responsive device producing a direct current proportional to the absolute value of the pressure to which it is subjected.

7. Apparatus as claimed in claim 6 in which said pressure responsive means is a piezo-electric device.

8. Device as claimed in claim 6 in which said pressure responsive device operates on a carrier frequency much greater than the frequency of the pressure variations in the cylinder.

9. Apparatus as claimed in claim 5 comprising a pulse generator which supplies a pulse at each change in the direction of change in the volume of the chamber, and a sign changing unit connected to receive said pulses and change the sign of the electrical magnitude supplied by said pressure responsive means each time a pulse is received.

10. Apparatus as claimed in claim 5 which comprises a differential integrating circuit connected to produce a current proportional to the integral as a function of time of the pressure in said chamber.

11. Apparatus as claimed in claim 9 which comprises a sign checking unit connected to prevent the pulse generator from supplying a pulse to said sign changer when the current leaving the integrating circuit is negative.

12. Apparatus as claimed in claim 5 which comprises means for producing an electrical signal representative of the energy supplied to said machine which is of the same nature as the signal furnished by the integrating means supplied by the pressure responsive means.

References Cited

UNITED STATES PATENTS

| | | | |
|---|---|---|---|
| 2,349,560 | 5/1944 | Reijnst | 73—115 |
| 3,283,569 | 11/1966 | King et al. | 73—115 |
| 3,374,666 | 3/1968 | Shattuck | 73—115 |
| 3,375,711 | 4/1968 | Ives et al. | 73—115 X |

JERRY W. MYRACLE, Primary Examiner

U.S. Cl. X.R.

73—115